(12) United States Patent
Saito (10) Patent No.: US 6,330,360 B1
(45) Date of Patent: *Dec. 11, 2001

(54) IMAGE PROCESSING APPARATUS AND METHOD

(75) Inventor: Kazuyuki Saito, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,688

(22) Filed: Apr. 7, 1997

(30) Foreign Application Priority Data

Apr. 19, 1996 (JP) .................................................. 8-098403

(51) Int. Cl.$^7$ ........................................................ G06K 9/46
(52) U.S. Cl. .......................................... 382/202; 382/204
(58) Field of Search .................................... 382/171, 175, 382/190, 202, 204, 180, 287, 296; 358/464, 453, 462, 488; 250/557, 568; 345/648, 659; 348/583

(56) References Cited

U.S. PATENT DOCUMENTS

| | | | | |
|---|---|---|---|---|
| 4,933,984 | * | 6/1990 | Nakano et al. | 382/175 |
| 5,048,107 | * | 9/1991 | Tachikawa | 382/173 |
| 5,075,895 | * | 12/1991 | Bessho | 382/175 |
| 5,101,448 | * | 3/1992 | Kawachiya et al. | 382/287 |
| 5,129,012 | * | 7/1992 | Abe | 382/190 |
| 5,159,667 | * | 10/1992 | Borrey et al. | 382/171 |

* cited by examiner

Primary Examiner—Samir Ahmed
(74) Attorney, Agent, or Firm—Fitzpatrick, Cella, Harper & Scinto (57) ABSTRACT

Ruled-line information is stored in a ROM. The ruled-line information relates to ruled lines present in images of originals having a plurality of different formats. Based upon consecutive pixels present in an entered image of an original, the format of this original image is identified as one format of the formats that have been stored in the ROM. Ruled lines present in the entered original image are extracted based upon the ruled-line information of the format identified.

15 Claims, 9 Drawing Sheets

| | | | | | | | | | | | 本籍 |
|---|---|---|---|---|---|---|---|---|---|---|---|
| | | 某町三百四十五番地豊臣太郎戸籍から入籍 | 目三十番地徳川家康同人妻家子の養子となる縁組届出町田 | 平成葉百年四月拾参日徳川家康同人妻とともに東京都太田区下丸子参丁 | 五十六番地豊臣秀吉戸籍から入籍 | 平成六拾五年壱月拾弐日冬野夏子婚姻届出町田市某町四百 | 平成四拾五年五月六日町田市で出生同月拾弐日父届出入籍 | | 平成百年四月拾参日編製 | | 東京都大田区下丸子三丁目三十番地 |
| 出生 | 夫 | 養母 | 養父 | 母 | 父 | | | | | 氏名 | |
| 平成四十五年五月六日 | 太郎 | 家子 養子 | 徳川 家康 | 豊臣 秀子 男 | 豊臣 秀吉 二 | | | | | 徳川 太郎 | |

| |
|---|
| RULED LINE SERVING AS KEY OF UPPER EDGE |
| RULED LINE SERVING AS KEY OF "LEGAL DOMICILE" COLUMN |
| RULED LINE SERVING AS KEY OF "COMPILATION" COLUMN |
| RULED LINE SERVING AS KEY OF "REGISTER ENTRY COLUMN" AND "BIRTHPLACES OF MOTHER AND FATHER" |
| RULED LINE SERVING AS KEY OF "FAMILY RELATIONSHIP" COLUMN |
| RULED LINE SERVING AS KEY OF LOWER EDGE |

FIG. 6

| | | | | | | | | | | | | |
|---|---|---|---|---|---|---|---|---|---|---|---|---|
| 出生 | 夫 | 養母 | 養父 | 母 | 父 | | | | | | | 本籍 |
| 平成四十五年五月六日 | 太郎 | 家子 | 徳川 家康 | 秀子 | 豊臣 秀吉 | 五十六番地豊臣秀吉戸籍から入籍 | 平成六拾五年壱月拾弐日冬野夏子婚姻届出町田市某町四百 | 平成四拾五年五月六日町田市で出生同月拾弐日父届出入籍 | 平成百年四月拾参日編製 | | | 東京都大田区下丸子三丁目三十番地 |
| | | 養子 | 養男二 | | | 某町三百四十五番地豊臣太郎戸籍から入籍 | 目三十番地徳川家康同人妻家子の養子となる縁組届出町田 | 平成葉百年四月拾参日妻とともに東京都大田区下丸子参丁 | | | 氏名 | 徳川 太郎 |

| | | | | | | | |
|---|---|---|---|---|---|---|---|
| | | | | | | | 本 籍 |
| 某町三百四十五番地豊臣太郎戸籍から入籍 | 目三十番地徳川家康同人妻家子の養子となる縁組届出町田 | 平成葉百年四月拾参日妻とともに東京都大田区下丸子参丁 | 五十六番地豊臣秀吉戸籍から入籍 | 平成六拾五年壱月拾弐日冬野夏子婚姻届出町田市某町四百 | 平成四拾五年五月六日町田市で出生同月拾弐日父届出入籍 | 平成百年四月拾参日編製 | 東京都大田区下丸子三丁目三十番地 |
| 出生 | 夫 | 養母 | 養父 | 母 | 父 | | 氏 名 |
| 平成四十五年五月六日 | 太郎 | 家子 | 徳川 家康 | 秀子 | 豊臣 秀吉 | | 徳川　太郎 |
| | | 養子 | | 二男 | | | |

IMAGE PROCESSING APPARATUS AND METHOD

BACKGROUND OF THE INVENTION

This invention relates to an image processing apparatus and method for extracting ruled lines present in the image of an entered original.

When ruled lines are to be extracted in the image of an original having a plurality of such lines using a conventional image processing apparatus, the conventional practice is to calculate a density histogram of the image of the original and extract the ruled lines based upon the density histogram calculated, or to extract the ruled lines based upon continuity of pixels in the image of the original.

With the conventional image processing apparatus described above, however, ruled lines in the image of an original cannot be extracted accurately or characters are mistakenly extracted as ruled lines if the ruled lines are skewed, blurred, positionally displaced or are of different sizes, by way of example.

Further, there are methods available in which the extraction of ruled lines on an original image having a specific format is performed with greater accuracy by acquiring information indicative of positions of the ruled lines from the format. However, such methods cannot be applied to an original image other than one having the specific format.

SUMMARY OF THE INVENTION

Accordingly, an object of the present invention is to provide an image processing apparatus and method in which images of originals having formats of a plurality of types can be identified and ruled lines present in the original image can be extracted based upon the format identified, thereby making it possible to extract ruled lines more accurately.

According to the present invention, the foregoing object is attained by providing an image processing apparatus for extracting ruled lines present in an entered original image, comprising storage means for storing ruled-line information relating to ruled lines present in each original image of original images having formats of a plurality of types, identification means for identifying, based upon consecutive pixels present in the entered original image, the format of this original image as one format of formats stored in the storage means, and extraction means for extracting the ruled lines present in the entered original image based upon the ruled-line information of the format identified by the identification means.

In a preferred embodiment, the apparatus further comprises correction means for correcting skewing of the entered original image. Correcting for skewing of the original image makes it possible to extract ruled lines more accurately.

In a preferred embodiment, the ruled-line information includes key ruled-line information serving as a key for identifying formats of a plurality of types.

In a preferred embodiment, the identification means includes acquisition means for acquiring consecutive pixels defining a length greater than a predetermined length based upon a relative positional relationship of consecutive pixels present in the entered original image, and comparison means for comparing the consecutive pixels acquired by the acquisition means with the key ruled-line information, wherein the identification means identifies the format of the entered original image as one format of formats stored in the storage mean based upon results of comparison performed by said comparison means.

In a preferred embodiment, the apparatus further comprises re-acquisition means for re-acquiring consecutive pixels defining a length greater than the predetermined length present in the entered original image based upon the key ruled-line information in a case where numbers of consecutive pixels acquired by the acquisition means are less than the numbers of consecutive pixels in the key ruled-line information of the format identified by the identification means. Providing the re-acquisition means makes it possible to acquire blurred consecutive pixels.

In a preferred embodiment, the key ruled-line information indicates ruled lines having a prescribed direction.

According to the present invention, the foregoing object is attained by providing an image processing method for extracting ruled lines present in an entered original image, comprising a storage step of storing, on a storage medium, ruled-line information relating to ruled lines present in each original image of original images having formats of a plurality of types, an identification step of identifying, based upon consecutive pixels present in the entered original image, the format of this original image as one format of formats stored on the storage medium at the storage step, and an extraction step of extracting the ruled lines present in the entered original image based upon the ruled-line information of the format identified by the identification step.

According to the present invention, the foregoing object is attained by providing a computer readable memory storing program codes of image processing, comprising a program code of a storage step of storing, on a storage medium, ruled-line information relating to ruled lines present in each original image of original images having formats of a plurality of types, a program code of an identification step of identifying, based upon consecutive pixels present in the entered original image, the format of this original image as one format of formats stored on the storage medium at the storage step, and a program code of an extraction step of extracting the ruled lines present in the entered original image based upon the ruled-line information of the format identified at the identification step.

Thus, in accordance with the present invention as described above, it possible to provide an image processing apparatus and method in which images of originals having formats of a plurality of types can be identified and ruled lines present in the original image can be extracted based upon the format identified, thereby making it possible to extract ruled lines more accurately.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the drawings.

Figure 1:
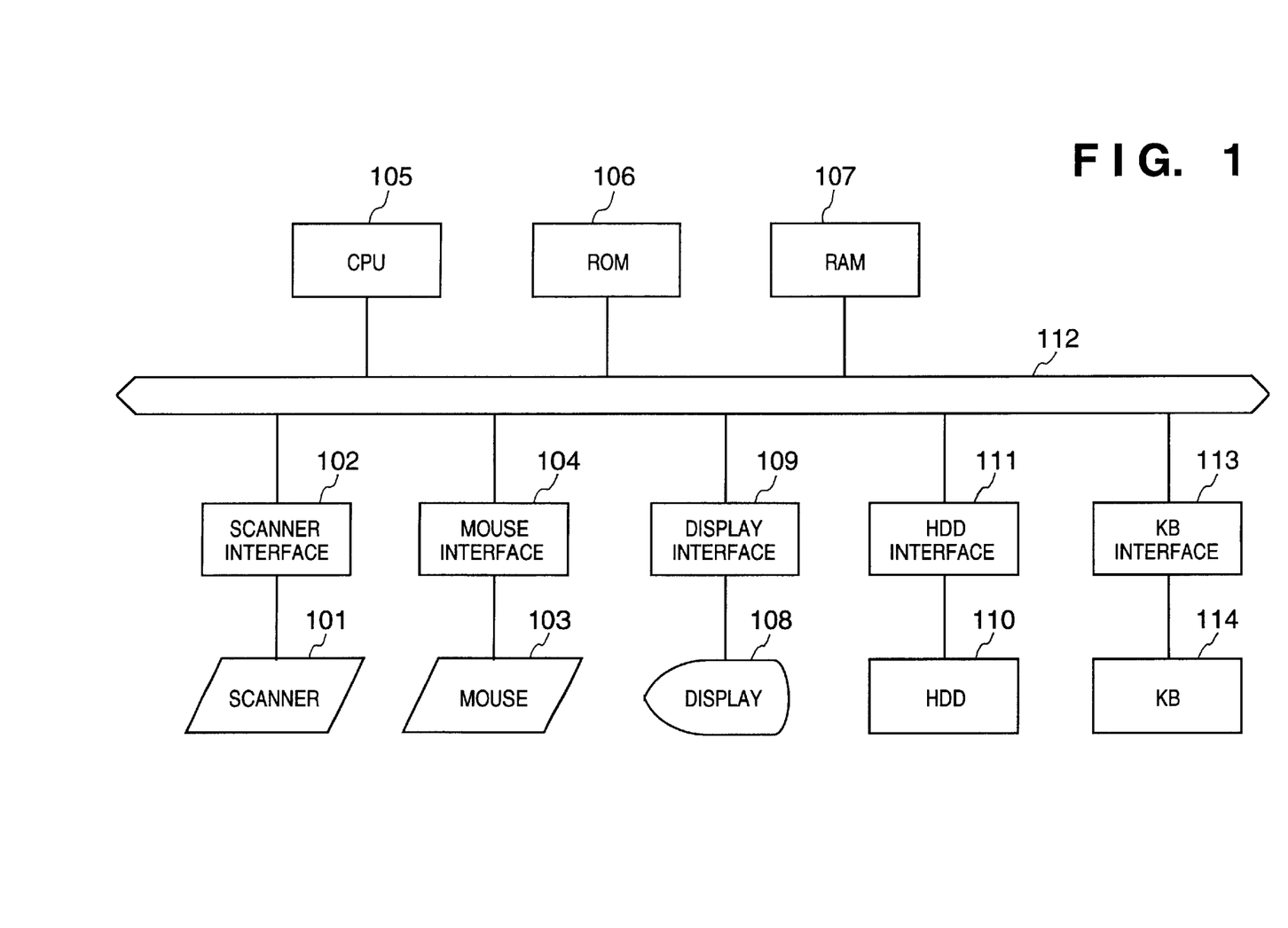
FIG. 1 is a block diagram illustrating the functional configuration of an image processing apparatus according to this embodiment of the present invention.

FIG. 1 is a block diagram illustrating the functional configuration of an image processing apparatus according to this embodiment of the present invention.

As shown in FIG. 1, the apparatus includes a scanner 101 for irradiating an original with light, reading the light reflected from the original and converting the reflected light to an electric signal. The image of the original read in from the scanner 101 is stored as image data in a VRAM area of a RAM 107. This area is allocated as a prescribed address area of the RAM 107. A scanner interface 102 converts the electric signal obtained by the scanner 101 to a binary digital electric signal and transfers this signal to other elements of the apparatus. A mouse 103 functions as a pointing device. A mouse interface 104 receives a signal from the mouse 103 and transmits the signal to other elements of the apparatus. A keyboard (KB) 114 is used to enter data and to execute instructions. A keyboard interface 113 receives a signal from the keyboard 114 and sends the signal to other elements of the apparatus.

A CPU 105 executes control of the overall apparatus, processing according to this invention, such as processing for extracting ruled lines, described later, and recognition processing. A ROM 106 stores the control program and various processing programs executed by the CPU 105, as well as various data such as font data. Information relating to key ruled lines for identifying the format of a family register by document format identification processing, described below, and information for extracting vertical ruled lines by ruled-line position inferring and extraction processing, described later, is stored in the ROM 106 as ruled-line information. The RAM 107 is used as a working area for developing the image of an original and for ruled line extraction processing. The RAM 107 has the VRAM area as a prescribed storage area for storing image data (binary image data) that have been read in from the scanner 101. A display 108 displays image data that have been stored in the VRAM area of the RAM 107, as well as the results of ruled image extraction processing executed in this embodiment. The display 108 is interfaced by a display interface 109.

A hard disk drive (HDD) 110 accommodates a hard disk and is capable of reading data from and writing data to the hard disk. The program of a processing flow described later is written to the loaded hard disk (not shown) and processing can be executed by reading this program into the RAM 107 of the apparatus. The hard disk driver 110 is interfaced by a hard disk drive interface 111. The elements of the apparatus mentioned above are connected to a bus 112.

The processing executed in this embodiment will now be described with reference to the flowchart of FIG. 2.

Figure 2:
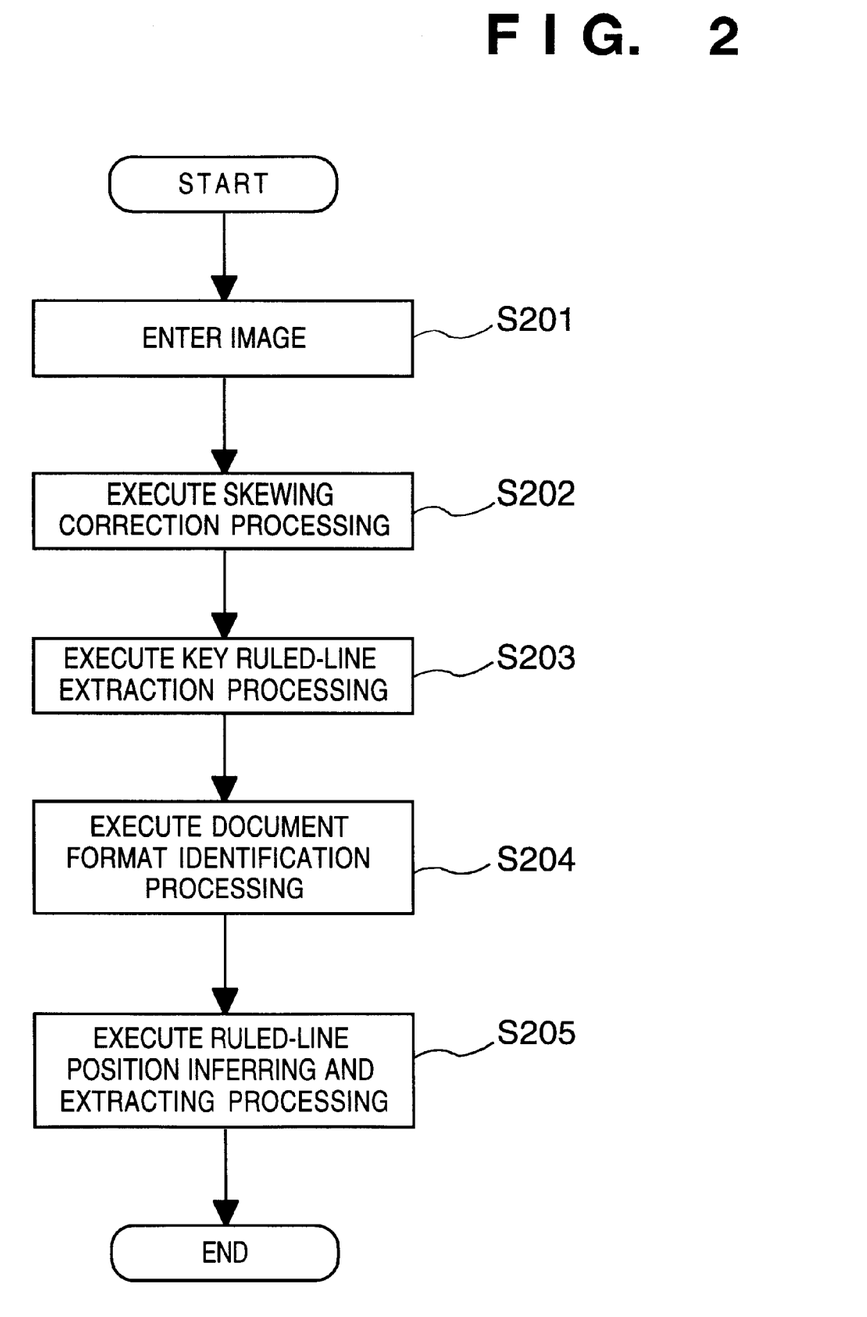
FIG. 2 is a flowchart illustrating the flow of processing executed in this embodiment.

FIG. 2 is a flowchart illustrating the flow of processing executed in this embodiment.

The processing executed in this embodiment will be described with regard to a case where the processing is applied to a document having established areas (referred to as "columns" below) defined by ruled lines constituting the image of an original. An example of such a document is a family register of the kind shown in FIG. 3. However, this does not impose any limitation upon the invention. For example, the invention can be applied to any original image the organization of which is predetermined. Moreover, the family register mentioned above is comparable to an official document such as a birth certificate or marriage certificate in, say, the United States of America.

Step S201 of the flowchart of FIG. 2 calls for the image of the original to be read in and converted to binary image data by the scanner 101. This followed by step S202, at which the binary image data obtained is examined to calculate the angle of inclination of the binary image. If the angle of inclination is greater than a predetermined threshold value Ts, skewing correction processing is executed to correct the binary image data in such a manner that the angle of inclination is eliminated.

Next, at step S203, key ruled-line extraction processing is executed to extract key ruled lines, which serve as a key, included in the binary image data. Various information such as coordinate data indicative of extracted key ruled lines is managed as ruled-line data in the manner shown in FIG. 4. It should be noted that key ruled lines are horizontal ruled lines serving as a key for identifying the format which indicates the organization of the family register document shown in FIG. 3. The details will be described later.

The ruled-line data shown in FIG. 4 will now be described.

Figure 4:
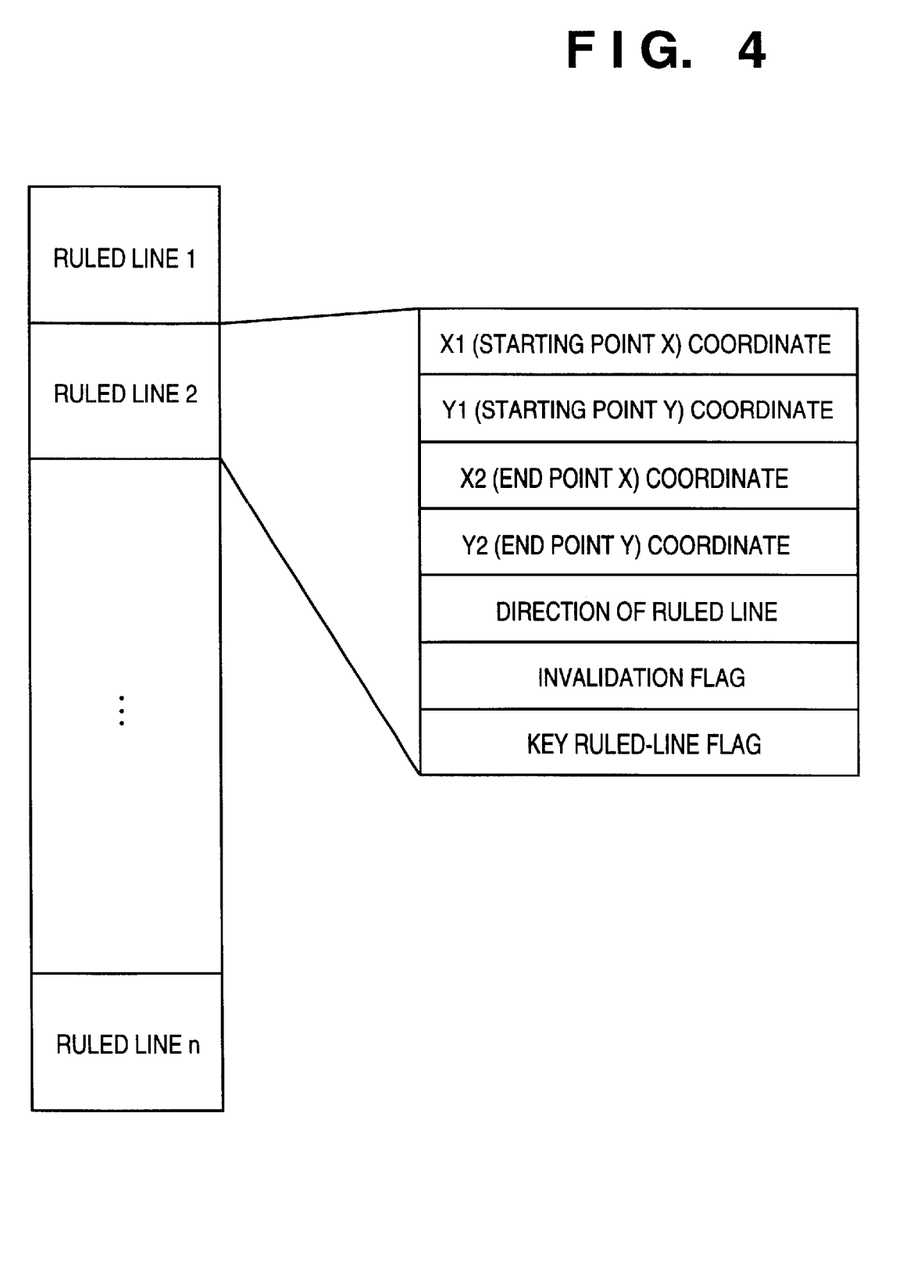
FIG. 4 is a diagram illustrating the structure of ruled-line data in this embodiment.

FIG. 4 is a diagram illustrating the structure of ruled-line data in this embodiment.

Shown in FIG. 4 are starting-point coordinates (X1,Y1) and end-point coordinates (X2,Y2) indicating the position of a key ruled line included in the binary image data developed in the RAM 107, as well as such information as the direction of the ruled line, an invalidation flag and a key ruled-line flag. The starting-point coordinates indicate the position coordinates of the right end of a horizontal ruled line present on the family register document shown in FIG. 3, and the end-point coordinates indicate the position coordinates of the left end of the corresponding horizontal ruled line. The direction of a ruled line indicates whether a ruled line is a horizontal ruled line or a vertical ruled line. For example, "0" is stored in the RAM 107 in case of a horizontal ruled line and "1" in case of a vertical ruled line. The invalidation flag indicates whether an extracted horizontal ruled line is invalid or not. For example, "1" is stored as the flag if an extracted horizontal ruled line is invalid and "0" if the extracted horizontal ruled line is not invalid. The key ruled-line flag indicates whether an extracted horizontal ruled line is a key ruled-line candidate. For example, "1" is stored as the flag if an extracted horizontal ruled line is a key ruled-line candidate and "0" if the extracted horizontal ruled line is not a key ruled-line candidate.

When the apparatus is started up, the invalidation flag and key ruled-line flag of the ruled-line data initially are "0".

The key ruled-line extraction processing executed at step S203 will now be described in detail.

First, consecutive pixels in the x direction (the horizontal direction) in the binary image data are retrieved and binary image data having consecutive pixels in excess of a predetermined value Ta are extracted as one horizontal ruled line. The relative positional relationship of extracted horizontal ruled lines are investigated and horizontal ruled lines which have the same y coordinate and a length along the x axis that is less than the dots of a predetermined threshold value Th are extracted as one horizontal ruled line. At this time the starting-point and end-point coordinates of the ruled-line data of one horizontal ruled line are updated and the invalidation flag of the ruled-line data of the other horizontal ruled line is stored as "1", thereby invalidating this horizontal ruled line.

Next, horizontal ruled lines whose lengths are greater than a predetermined threshold value Tc are selected from among the horizontal ruled lines to serve as key ruled-line candidates, and the key ruled-line flag in the ruled-line data of these horizontal ruled lines is made "1".

Figure 5:
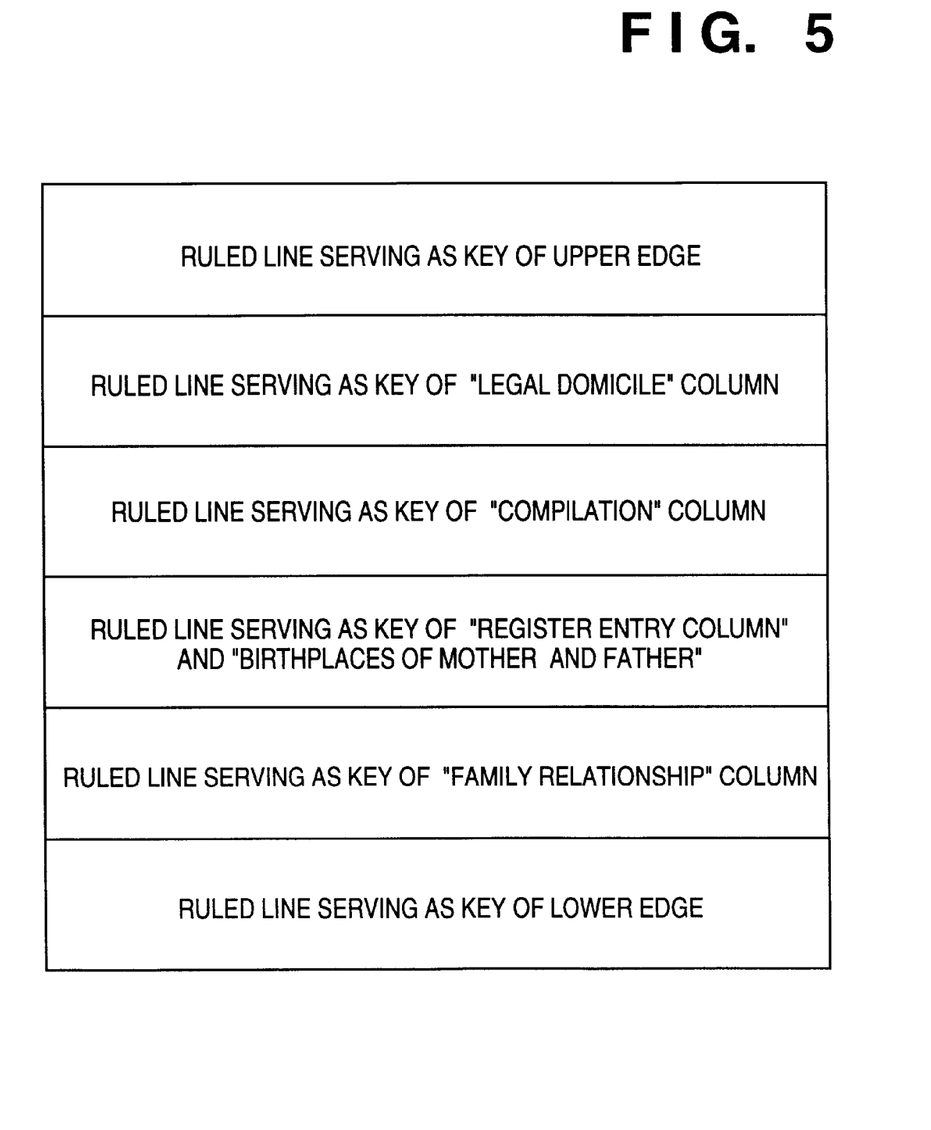
FIG. 5 is a diagram illustrating the composition of a key ruled-line data table in this embodiment.

Next, based upon the lengths of the key ruled-line candidates and their positional relationships, each key ruled-line candidate is classified as being either a key ruled line serving as the key of the upper edge of the family register document, a key ruled line serving as the key of the lower edge of the family register document, a key ruled line serving as the key of the "legal domicile" column, a key ruled line serving as the key of the "compilation" column, a key ruled line serving as the key of the "register entry" column and "birthplaces of mother and father" column or a key ruled line serving as the key of the "family relationship" column. Upon being so classified, the candidates are stored in a key ruled-line data table illustrated in FIG. 5.

Figure 3:
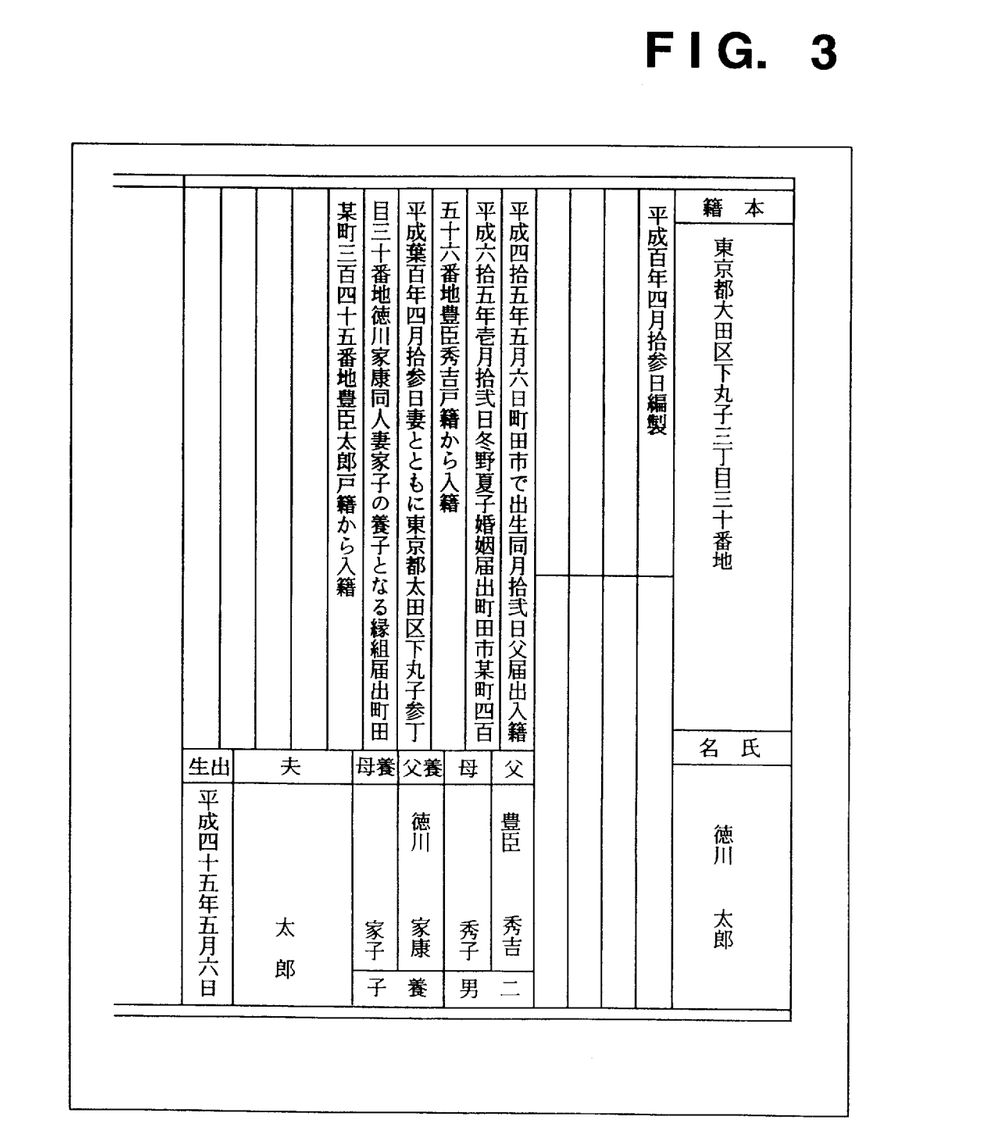
FIG. 3 illustrates an example of the image of an original in this embodiment.
Figure 6:
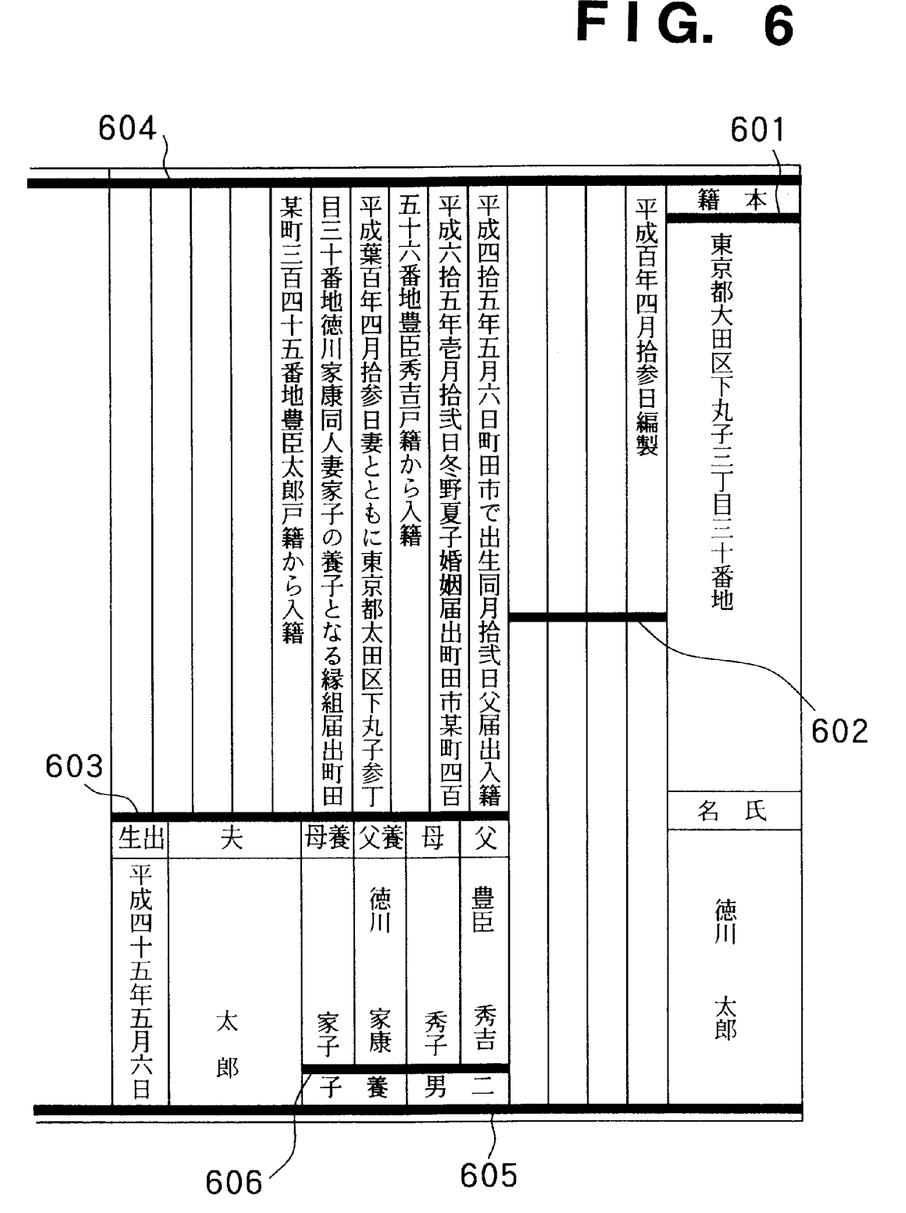
FIG. 6 is a diagram illustrating the results of key ruled-line extraction processing executed with respect to the image of an original in this embodiment.

When, by way of example, this key ruled-line extraction processing is applied to the family register document of FIG. 3, key ruled-line candidates whose lengths are greater than the predetermined value Tc, and which are indicated by the bold lines in FIG. 6, are extracted. Then, based upon the positional relationship among the extracted candidates, key ruled-line candidates 604, 605 which are on the inner sides of double lines at the upper edge of the family register and double lines at the lower edge of the family register are adopted as the key ruled line of the upper edge and the key ruled line of the lower edge, respectively, a key ruled-line candidate 601 is adopted as the key ruled line of the "legal domicile" column, a key ruled-line candidate 602 is adopted as the key ruled line of the "compilation" column, a key ruled-line candidate 603 is adopted as the key ruled line of the "register entry" column and "birthplaces of mother and father" column, and a key ruled-line candidate 606 is adopted as the key ruled line of the "family relationship" column. These are stored in the key ruled-line data table.

Key rules lines are extracted in the manner set forth above.

Next, at step S204, document-format identification processing for identifying the format indicative of the organization of the family register is executed by comparing the content stored in the key ruled-line data table and the ruled-line information stored in the ROM 106.

More specifically, reference is had to the key ruled-line data table. If the key ruled line of the "legal domicile" column or the key ruled line of the "compilation" column is present, or if the length of the key ruled line of the "register entry" column and "birthplaces of mother and father" column is substantially the same as the length of the key ruled line of the upper edge or lower edge, then the format (referred to as "page type" below) of the family register document is identified as being of the "Family Head" type, namely the type in which the head of the family has been entered. On the other hand, if the key ruled line of the "legal domicile" column or the key ruled line of the "compilation" column is not present, or if the length of the key ruled line of the "register entry" column and "birthplaces of mother and father" column is less than two-thirds the length of key ruled line of the upper edge or lower edge, then the page type is identified as being of the "Non-family Head" type, namely the type in which the head of the family has not been entered.

For example, in a case where key ruled lines of the kind shown in FIG. 6 have been extracted, the key ruled line 601 of the "legal domicile" column and the key ruled line 602 of the "compilation" column are present in the table. This means that the page type is the "Family Head" type. Further, the length of the key ruled line 603 of the "register entry" column and "birthplaces of mother and father" column is less than two-thirds the length of key ruled line 604 of the upper edge or key ruled line 605 of the lower edge. This also indicates that the page type is the "Family Head" type.

Next, at step S205, ruled-line position inferring processing is executed to infer the positions of vertical ruled lines present in the family register document based upon the key ruled lines that have been extracted and extract vertical ruled lines present at the positions inferred.

Figure 7:
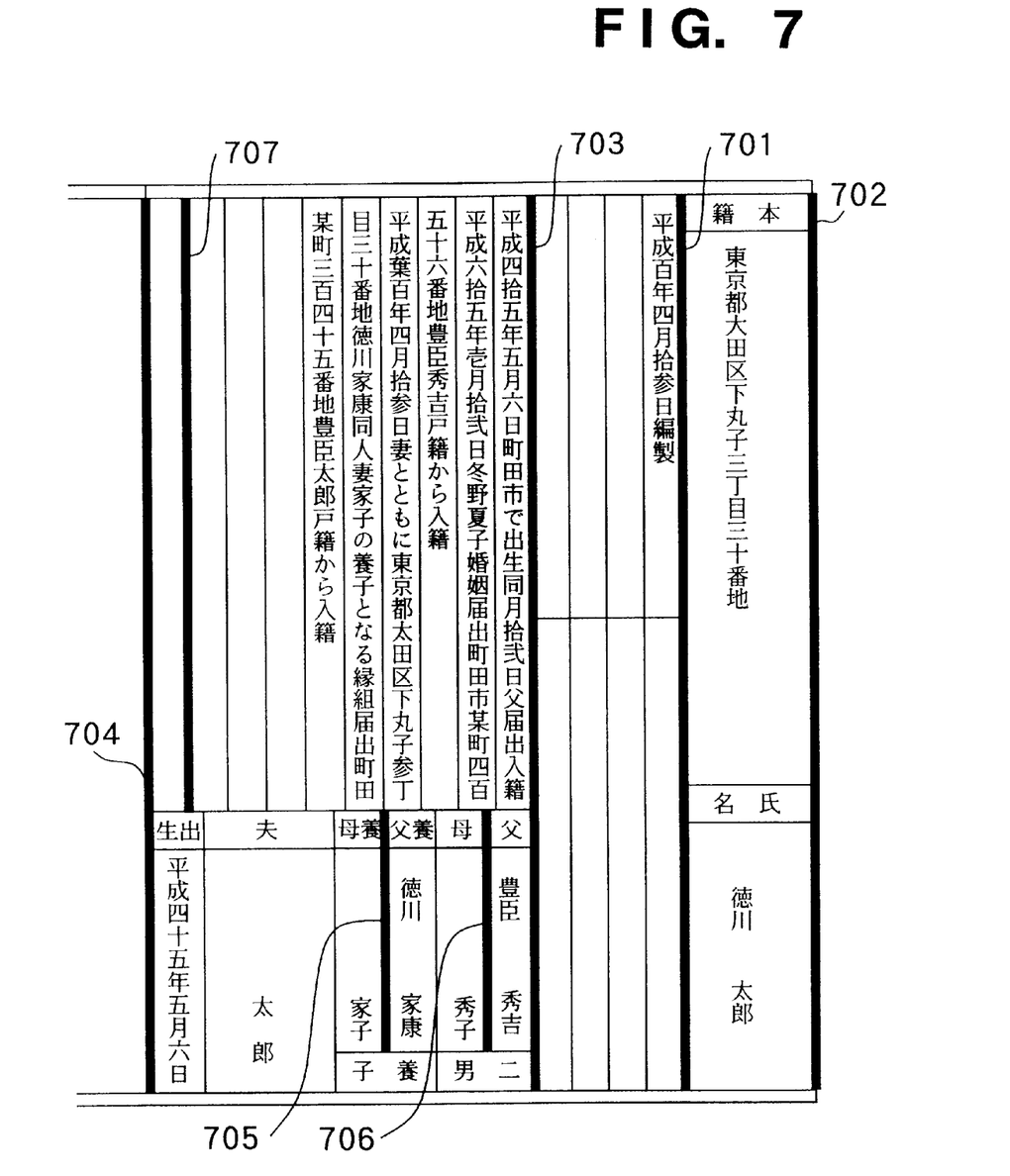
FIG. 7 is a diagram illustrating the results of processing, applied to the image of an original, for inferring and extracting the positions of ruled lines in this embodiment.

First, from the results of extracting the key ruled lines in the example of FIG. 6, it is found that the key ruled line 601 is the key ruled line of the "legal domicile" column. Accordingly, it is inferred from the ruled-line information stored in the ROM 106 that there are vertical ruled lines at both ends of the ruled line 601. Next, a ruled-line extraction range, which is a range over which pixels are searched to extract the vertical ruled lines at both ends of the horizontal ruled line, is set. For example, if the x coordinate of the left end of the key ruled line 601 is xbL and the x coordinate of the right end is XbR, then a ruled-line extraction range in the x direction for extracting a vertical ruled line present near the left end is set as $xbL-dx \leq x \leq xbL+dx$. Further, a ruled-line extraction range in the y direction is set as $Y2<y<Y1$, where Y1 is the y coordinate of the key ruled line of the upper edge and Y2 the y coordinate of the key ruled line of the lower edge. A density histogram of pixels which are present within this range is calculated, the position corresponding to the peak of the density histogram is inferred as being the position at which a vertical ruled line 701 of the kind shown in FIG. 7 is present, and the ruled line residing at this position is extracted as the vertical ruled line 701.

It should be noted that dx is a value provided in order to set a search range which takes into account a deviation in the left end of the ruled line, blurring, etc.

Similarly, a ruled-line extraction range in the x direction for extracting a vertical ruled line present near the right end of the ruled line 601 is set as $xbR-dx \leq x \leq xbR+dx$ and a ruled line 702 is extracted.

Since the key ruled line 602 is the key ruled line of the "compilation" column, it is inferred from the ruled-line information stored in the ROM 106 that there are five vertical ruled lines which include three vertical ruled lines that divide the key ruled line 602 into four equal parts and two vertical ruled lines at the respective ends of the key ruled line 602. Next, a ruled-line extraction range is set, namely a search range of pixels for extracting the vertical ruled lines that divide the key ruled line 602 into four equal parts and the vertical ruled lines at either end of the key ruled line 602. For example, if the x coordinate of the left end of the key ruled line 602 is xfL and the x coordinate of the right end is xfR, then a ruled-line extraction range in the x direction for extracting a vertical ruled line present near the left end is set as xfL−dx≦x≦xfL+dx. Further, a ruled-line extraction range in the y direction is set as Y2<y<Y1, where Y1 is the y coordinate of the key ruled line of the upper edge and Y2 the y coordinate of the key ruled line of the lower edge. A density histogram of pixels which are present within this range is calculated, the position corresponding to the peak of the density histogram is inferred as being the position at which a vertical ruled line 703 of the kind shown in FIG. 7 is present, and the ruled line residing at this position is extracted as the vertical ruled line 703.

Next, a ruled-line extraction range in the x direction is set. This is a range for extracting one vertical ruled line, which neighbors the extracted vertical ruled line 703 and divides the key ruled line 602 into four equal parts. Accordingly, first a length dw that divides the key ruled line 602 into four equal parts is calculated in accordance with the following equation:

$$dw = |xfR - xfL| \times \frac{1}{4}$$

Next, using the calculated dw and the x coordinate xh of the extracted vertical ruled line 703, a ruled-line extraction range in the x direction is set as xh+dw−dx≦x≦xh+dw+dx, and a ruled-line extraction range in the y direction is set as Y2<y<Y1. One of the vertical ruled lines that neighbor the extracted vertical ruled line 703 and divide the key ruled line 602 into four equal parts is extracted.

The three remaining vertical ruled lines are extracted in similar fashion. As a result, three vertical ruled lines that divide the key ruled line 602 into four equal parts, the vertical ruled line 703 and the vertical ruled line 701 are extracted.

Further, the key ruled line 603 is the key ruled line of the "register entry" column. Accordingly, based upon the ruled-line information stored in ROM 106, it is inferred that there are 11 vertical ruled lines, which include nine vertical ruled lines that divide the key ruled line 602 into ten equal parts, and two vertical ruled lines at either end of the key ruled line 603. Next, a ruled-line extraction range is set, namely a search range of pixels for extracting the vertical ruled lines that divide the key ruled line 603 into ten equal parts and the vertical ruled lines at either end of the key ruled line 603. For example, if the x coordinate of the left end of the key ruled line 603 is xgL and the x coordinate of the right end is XgR, then a ruled-line extraction range in the x direction for extracting a vertical ruled line present near the left end is set as xgL−dx≦x≦xgL+dx. Further, a ruled-line extraction range in the y direction is set as Y2<y<Y1, where Y1 is the y coordinate of the key ruled line of the upper edge and Y2 the y coordinate of the key ruled line of the lower edge. A density histogram of pixels which are present within this range is calculated, the position corresponding to the peak of the density histogram is inferred as being the position at which a vertical ruled line 704 of the kind shown in FIG. 7 is present, and the ruled line residing at this position is extracted as the vertical ruled line 704.

Next, a ruled-line extraction range in the x direction is set. This is a range for extracting one vertical ruled line, which neighbors the extracted vertical ruled line 703 and divides the key ruled line 603 into ten equal parts. Accordingly, first a length dw that divides the key ruled line 603 into ten equal parts is calculated in accordance with the following equation:

$$dw = |xfR - xfL| \times \frac{1}{10}$$

Next, using the calculated dw and the x coordinate xg of the extracted vertical ruled line 704, a ruled-line extraction range in the x direction is set as xg+dw−dx≦x≦xg+dw+dx, and a ruled-line extraction range in the y direction is set as Y2<y<Y1, where Y1 is the y coordinate of the key ruled line of the upper edge and Y2 the y coordinate of the key ruled line of the "register entry" column. A vertical ruled line 707, which is one of the vertical ruled lines that neighbor the extracted vertical ruled line 703 and divide the key ruled line 603 into ten equal parts, is extracted.

The eight remaining vertical ruled lines of the lines that divide the key ruled line 603 into ten equal parts are extracted in similar fashion. Since the vertical ruled line 703 at the right end of the key ruled line 603 has already been extracted, no processing is performed with regard to this line. As a result, nine vertical ruled lines, inclusive of the vertical ruled line 704, that divide the key ruled line 603 into ten equal parts, and the vertical ruled line 704 are extracted.

Further, the key ruled line 603 is also the key ruled line of the "birthplaces of mother and father" column. Accordingly, it is inferred from the ruled-line information stored in the ROM 106 that there are vertical ruled lines between the key ruled line 603 and the key ruled line 605.

Since the ruled-line extraction range is limited to the range between the key ruled line 603 and the key ruled line 605, the vertical ruled lines can be extracted without any influence from the "register entry" column.

By using the x coordinates xgL and xgR of the left and right ends, respectively, of the key ruled line 603, the ruled-line extraction range in the x direction is set as xgL−dx≦x≦xgL+dx. A density histogram of pixels which are present within this range is calculated, the position corresponding to the peak of the density histogram is inferred as being the position at which a ruled line is present, and the ruled line residing at this position is extracted.

Now it can be determined, based upon the number of vertical ruled lines extracted, whether a foster father or foster method has been entered. For example, if seven vertical ruled lines are extracted, then the format is of the type in which a foster father and foster mother have both been entered. As a result, the vertical ruled line between the foster father and foster mother and the vertical ruled line between the father and the mother can be defined as ruled lines that stop at the "family relationship" key ruled line. If six vertical ruled lines are extracted, then the format is of the type in which only a foster father or foster mother has been entered. As a result, the vertical ruled line between the father and the mother can be defined as a ruled line that stops at key ruled line of "family relationship". If five vertical ruled lines are extracted, then the format is of the type in which neither a foster father nor foster mother has been entered. As a result, the vertical ruled line between the father and the mother can be defined as a ruled line that stops at key ruled line of "family relationship".

In the case of FIG. 6, there are seven vertical ruled lines between the key ruled line 603 and the key ruled line 602, and therefore it is understood that the format is of the type in which both a foster father and foster mother have been entered.

As a result, it is understood that only the vertical ruled lines 705 and 706 do not extend below the key ruled line 606. Accordingly, the y coordinates of these vertical ruled lines are revised to y coordinates identical with the y coordinate of the key ruled line 606.

The horizontal ruled lines and vertical ruled lines constituting the family register document are extracted in the manner described above.

Thus, in accordance with this embodiment as described above, extracting the key ruled lines contained in a family register document makes it possible to identify the format of this document, a plurality of types of which exist. On the basis of the format identified, the positions of vertical ruled lines are inferred and the vertical ruled lines are extracted. This makes it possible to extract vertical ruled lines more accurately.

Further, by providing skewing correction processing, key ruled-line extraction processing, document format identification processing and ruled-line position inferring and extracting processing, it is possible to extract ruled lines even in the presence of skewing, blurring, positional deviation or a difference in size. An advantage of this is that instances in which text is erroneously extracted as ruled lines can be reduced.

By adding key ruled-line re-extraction processing (step S806 in FIG. 8) to the processing described in the embodiment, it is possible to judge whether a key ruled line has been extracted and to extract a key ruled line not extracted the first time.

Figure 8:
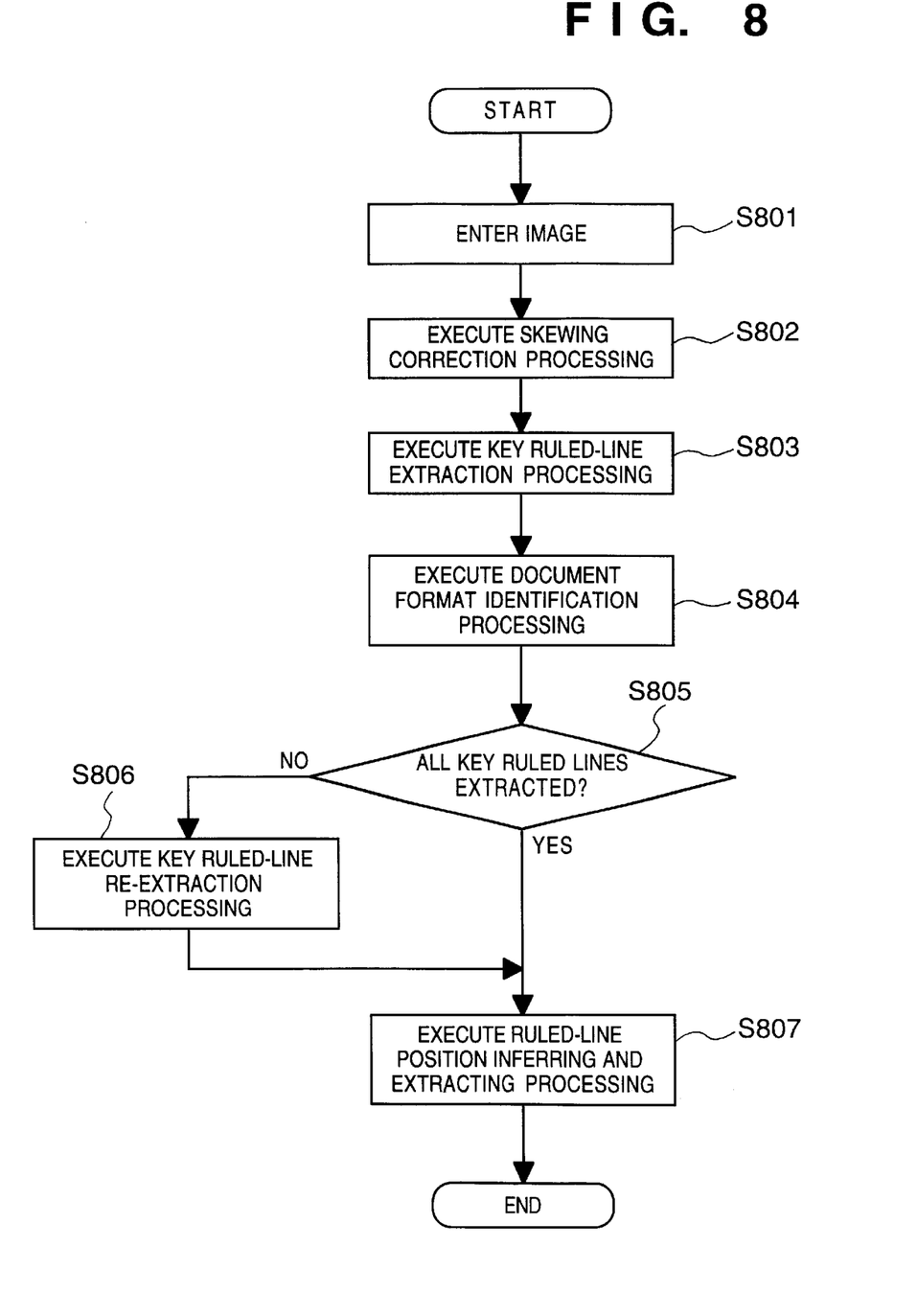
FIG. 8 is a flowchart of processing executed according to another embodiment of the invention.

FIG. 8 is a flowchart of processing executed according to another embodiment of the invention.

Step S801 of the flowchart of FIG. 8 calls for the image of the original to be read in and converted to binary image data by the scanner 101. This followed by step S802, at which the binary image data obtained is examined to calculate the angle of inclination of the binary image. If the angle of inclination is greater than a predetermined threshold value Ts, skewing correction processing is executed for correcting the binary image data in such a manner that the angle of inclination is eliminated.

Next, at step S803, key ruled-line extraction processing is executed to extract key ruled lines serving as a key included in the binary image data. Next, at step S804, document-format identification processing for identifying the format indicative of the organization of the family register is executed.

This is followed by step S805, at which it is determined whether the key ruled lines of the identified format of the family register document have been extracted. If they have been extracted ("YES" at step S805), the program proceeds to step S807. If they have not been extracted ("NO" at step S805), then the program proceeds to step S806.

Key ruled-line re-extraction processing is executed at step S806. This is processing for inferring the positions of key ruled lines that have not been extracted and then extracting, as key ruled lines, the ruled lines located at the positions inferred. Next, at step S807, ruled-line position inferring processing is executed to infer the positions of vertical ruled lines present in the family register document based upon the key ruled lines that have been extracted and extract vertical ruled lines present at the positions inferred.

Assume for example that the key ruled line 602 in FIG. 6 has not been extracted because it is blurred. This embodiment is such that if the key ruled line 601 or 603 has been extracted first, it can be determined from these key ruled lines that format of the family register document shown in FIG. 6 is of the "Family Head" type, after which the position of the key ruled line 602 is inferred so that the rule line 602 can be extracted.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Figure 9:
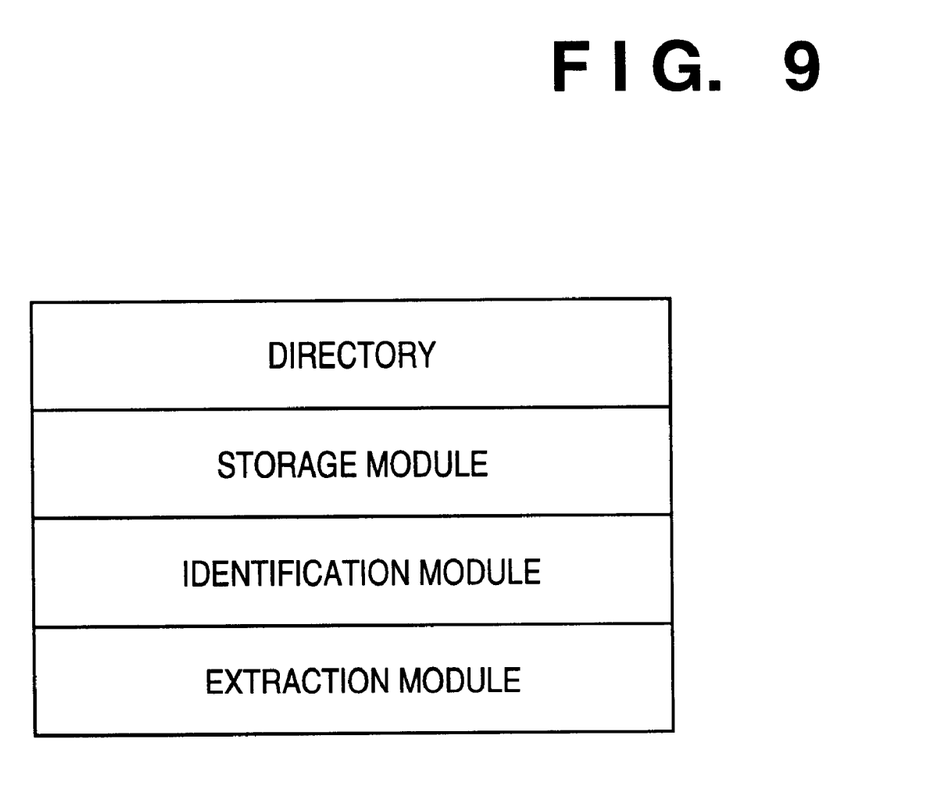
FIG. 9 is a diagram showing the structure of the memory map of a hard disk storing the program of processing executed according to the present invention.

In a case where the present invention is applied to the above-mentioned storage medium, program codes corresponding to the flowcharts described earlier are stored on this storage medium. More specifically, modules illustrated in the example of the memory map of FIG. 9 are stored on the storage medium.

Specifically, it will suffice to store program codes of at least a "storage module", an "identification module" and an "extraction module" on the storage medium.

The "storage module" stores ruled-line information on the storage medium. The ruled-line information relates to ruled lines present in each original image of original images having formats of a plurality of types. Based upon consecutive pixels present in the entered original image, the "identification module" identifies the format of this original image as one format of formats stored on the storage medium. The "extraction module" extracts the ruled lines present in the entered original image based upon the ruled-line information of the format identified.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for extracting ruled lines constructing columns present in an entered original image, comprising:

storage means for storing ruled-line information related to each image of a plurality of images, each image having a different format of a predetermined organization, wherein the ruled-line information includes key ruled-line information of key ruled lines used for identifying a format of the entered original image and inferring information used for inferring positions of ruled lines having a relative positional relation to the key ruled lines based on the format and the key ruled-line information;

first extraction means for extracting key ruled-line information of key ruled lines satisfying a predetermined condition from the entered original image based on the feature of the original image;

identification means for identifying a format of the entered original image by comparing the extracted key ruled-line information with the stored key ruled-line information; and second extraction means for inferring the positions of ruled lines of the entered original image by using the inferring information according to the identified format and the extracted key ruled-line information, and extracting the rules lines present at the inferred positions.

2. The apparatus according to claim 1, further comprising means for correcting skewing of the entered original image.

3. The apparatus according to claim 1, wherein said first extraction means extracts consecutive pixels defining a length greater than a predetermined length based upon a relative positional relationship of consecutive pixels present in the entered original image for the extracted key ruled-line information; and said identification means identifies the format of the entered original image by comparing the consecutive pixels and the stored key ruled-line information.

4. The apparatus according to claim 3, further comprising third extraction means for extracting consecutive pixels defining a length greater than the predetermined length present in the entered original images based upon the key ruled-line information of the format in a case where numbers of consecutive pixels extracted by said first extraction means are less than numbers of consecutive pixels in the key ruled-line information of the format identified by said identification means.

5. The apparatus according to claim 1, wherein the key ruled-line information indicates ruled lines having a prescribed direction.

6. An image processing method for extracting ruled lines constructing columns present in an entered original image, comprising:

a first extraction step of extracting key ruled-line information of key ruled lines satisfying a predetermined condition from the entered original image based on the feature of the original image, wherein ruled-line information, related to each image of a plurality of images, each image having a different format of a predetermined organization, are stored in a storage medium and includes the key ruled-line information of key ruled lines used for identifying a format of the entered original image and inferring information used for inferring positions of ruled lines having a relative positional relation to the key ruled lines based on the format and the key ruled-line information;

an identification step of identifying a format of the entered original image by comparing the extracted key ruled-line information with the stored key ruled-line information; and a second extraction step of inferring the positions of ruled lines of the entered original image by using the inferring information according to the identified format and the extracted key ruled-line information and extracting the rules lines present at the inferring positions.

7. The method according to claim 6, further comprising a step of correcting skewing of the entered original image.

8. The method according to claim 6, wherein said first extraction means extracts consecutive pixels defining a length greater than a predetermined length based upon a relative positional relationship of consecutive pixels present in the entered original image for the extracted key ruled-line information; and said identification step identifies the format of the entered original image by comparing the consecutive pixels and the stored key ruled-line information.

9. The method according to claim 8, further comprising a third extraction step of extracting consecutive pixels defining a length greater than the predetermined length present in the entered original image based upon the key ruled-line information of the format in a case where numbers of consecutive pixels extracted at said first extraction step are less than numbers of consecutive pixels in the key ruled-line information of the format identified at said identification step.

10. The method according to claim 6, wherein the key ruled-line information indicates ruled lines having a prescribed direction.

11. A computer readable memory storing program codes of image processing by extracting ruled lines constructing columns present in an entered original image, comprising:

a program code of a first extraction step of extracting key ruled-line information of key ruled lines satisfying a predetermined condition from the entered original image based on the feature of the original image, wherein ruled-line information, related to each image of a plurality of images, each image having a different format of a predetermined organization, are stored in a storage medium, and includes the key ruled-line information of key ruled lines used for identifying a format of the entered original image and inferring information used for inferring positions of rules lines having a relative positional relation to the key ruled lines based on the format and the key ruled-line information;

a program code of an identification step of identifying a format of the entered original image by comparing the extracted key ruled-line information with the stored key ruled-line information; and a program code of a second extraction step of inferring the positions of ruled lines of the entered original image by using the inferring information according to the identified format and the extracted key ruled-line information, and extracting the ruled lines present at the inferred positions.

12. The apparatus according to claim 1, wherein said predetermined condition is a length longer than a predetermined length.

13. The apparatus according to claim 1, wherein said inferring information is an area of a portion of the image specified by the key ruled line.

14. The method according to claim 6, wherein said predetermined condition is a length longer than a predetermined length.

15. The method according to claim 6, wherein said inferring information is an area of a portion of the image specified by the key ruled line.

* * * * *

UNITED STATES PATENT AND TRADEMARK OFFICE
CERTIFICATE OF CORRECTION

PATENT NO. : 6,330,360 B1
DATED : December 11, 2001
INVENTOR(S) : Kazuyuki Saito It is certified that error appears in the above-identified patent and that said Letters Patent is hereby corrected as shown below:

Column 1,
Line 66, "mean" should read -- means --.

Column 2,
Line 41, "it" should read -- it is --.

Column 3,
Line 48, "is" should read -- are --.

Column 4,
Line 18, "followed" should read -- is followed --.

Column 5,
Line 4, "are" should read -- is --;
Line 6, "Th" should read -- Tb --;
Line 50, "rules" should read -- ruled --; and
Line 58, "had" should read -- made --.

Column 8,
Line 36, "method" should read -- mother --.

Column 9,
Line 24, "followed" should read -- is followed --.

UNITED STATES PATENT AND TRADEMARK OFFICE
CERTIFICATE OF CORRECTION

PATENT NO.    : 6,330,360 B1
DATED         : December 11, 2001
INVENTOR(S)   : Kazuyuki Saito It is certified that error appears in the above-identified patent and that said Letters Patent is hereby corrected as shown below:

<u>Column 11,</u>
Line 11, "rules" should read -- ruled --; and
Line 62, "rules" should read -- ruled --.

<u>Column 12,</u>
Line 38, "rules" should read -- ruled --.

Signed and Sealed this

Fourth Day of March, 2003

JAMES E. ROGAN
*Director of the United States Patent and Trademark Office*